US008738652B2

(12) United States Patent
Kramer

(10) Patent No.: US 8,738,652 B2
(45) Date of Patent: May 27, 2014

(54) SYSTEMS AND METHODS FOR DYNAMIC ANOMALY DETECTION

(75) Inventor: Stephen Patrick Kramer, Austin, TX (US)

(73) Assignee: Paragon Science, Inc., Austin, TX (US)

(\*) Notice: Subject to any disclaimer, the term of this patent is extended or adjusted under 35 U.S.C. 154(b) by 1502 days.

(21) Appl. No.: 12/046,394

(22) Filed: Mar. 11, 2008

(65) Prior Publication Data

US 2009/0234899 A1 Sep. 17, 2009

(51) Int. Cl.
*G06F 17/10* (2006.01)

(52) U.S. Cl.
USPC ..................................... 707/776; 707/E17.08

(58) Field of Classification Search
USPC .............................. 708/200; 707/776, E17.06
See application file for complete search history.

(56) References Cited

U.S. PATENT DOCUMENTS

| | | | |
|---|---|---|---|
| 5,331,550 | A | 7/1994 | Stafford et al. |
| 7,162,489 | B2 | 1/2007 | Folting et al. |
| 7,188,053 | B2 | 3/2007 | Nikitin et al. |
| 7,310,590 | B1 | 12/2007 | Bansal |
| 7,739,211 | B2 | 6/2010 | Coffman et al. |
| 2003/0236652 | A1 | 12/2003 | Scherrer et al. |
| 2007/0289013 | A1 | 12/2007 | Lim |
| 2007/0294187 | A1 | 12/2007 | Scherrer |
| 2008/0075017 | A1 | 3/2008 | Kramer |
| 2008/0109730 | A1 | 5/2008 | Coffman et al. |

OTHER PUBLICATIONS

Chan, A Machine Learning Approach to Anomaly Detection, Mar. 29, 2003, pp. 1-13.*
Ray, Symbolic dynamic analysis of complex systems for anomaly detection, Signal Processing 84 (2004) pp. 1115-1130.*
Shadden, Definition and properties of Lagrangian coherent structures from finite-time Lyapunov exponents in two-dimensional aperiodic flows, Physica D 212 (2005) pp. 271-304.*
Fredrik Gustafsson The Marginalized Likelihood Ratio Test for Detecting Abrupt Changes Automatic Control, IEEE Transactions on (vol. 41 , Issue: 1) pp. 66-78 Jan. 1996.
Dragos Margineantu Data Mining Methods for Anomaly Detection SIGKDD Explorations vol. 7, Issue 2 Aug. 2, 2005.
Animesh Patcha and Jung-Min Park An Overview of Anomaly Detection Techniques: Existing Solutions and Latest Technological Trends Computer Networks Jun. 8, 2006.
Shou-De Lin and Hans Chalupsky Discovering and Explaining Abnormal Nodes in Semantic Graphs IEEE Transactions on Knowledge and Data Engineering May 4, 2006.
Marco Franciosi, Giulia Menconi Multi-dimensional sparse time series: feature extraction Dipartimento di Matematica Applicata, Universita di Pisa Mar. 4, 2008.

(Continued)

*Primary Examiner* — Albert Phillips, III
(74) *Attorney, Agent, or Firm* — Chowdhury & Georgakis, P.C.; Georgios A. Georgakis

(57) ABSTRACT

Methods and systems for detecting anomalies in sets of data are disclosed, including: computing components of one or more types of feature vectors at a plurality of values of one or more independent variables, each type of the feature vectors characterizing a set of input data being dependent on the one or more independent variables; computing one or more types of output values corresponding to each type of feature vectors as a function of the one or more independent variables using a nonlinear sequence analysis method; and detecting anomalies in how the one or more types of output values change as functions of the one or more independent variables.

21 Claims, 10 Drawing Sheets

(56) References Cited

OTHER PUBLICATIONS

Tsuyoshi Ide and Hisashi Kashima Effective Dimension in Anomaly Detection: Its Application to Computer Systems New Frontiers in Artificial Intelligence Lecture Notes in Computer Science vol. 3609, 2007, pp. 189-204 2007.
Tsuyoshi Ide and Hisashi Kashima Eigenspace-based Anomaly Detection in Computer Industry/Government Track PaperSystems 2004.
Tsuyoshi Ide and Keisuke Inoue Knowledge Discovery from Heterogeneous Dynamic Systems using Change-Point Correlations SIAM Oct. 4, 2004.
Thayne Coffman, Seth Greenblatt, and Sherry Marcus Graph-Based Technologies for Intelligence Analysis Communications of the ACM/vol. 47, No. 3 Mar. 2004.
Thayne Coffman and Sherry Marcus Pattern Classification in Social Network Analysis: A Case Study IEEEAC paper #1090, Version 3 Dec. 9, 2003.
Thayne Coffman and Sherry Marcus Dynamic classification of groups through Social Network Analysis and HMMs IEEEAC paper #1091, Version 3 Dec. 9, 2003.
Vincent Berk Process Query Systems for Surveillance and Awareness in Proc. System. Cyber. Infor. (SCI2003) 2003.
Valdis E. Krebs Mapping Networks of Terrorist Cells Connections 24(3): 43-52 2002 INSNA 2002.
Kathleen M. Carley Destabilizing Terrorist Networks Proceedings of the 8th International Command and Control Research and Technology Symposium, 2003.
Kathleen M. Carley Destabilizing Dynamic Covert Networks Proceedings of the 8th International Command and Control Research and Technology Symposium, 2003.
Tami Carpenter Practical Issues and Algorithms for Analyzing Terrorist Networks Telcordia Technologies, Inc., 2002.
D.B. Skillicorn Applying Matrix Decompositions to Counterterrorism Department of Computing and Information Science, Queen's University, Kingston, Ontario, Canada K7L 3N6, 2004.
Robert Popp, Thomas Armour, Ted Senator, and Kristen Numrych Countering Terrorism Through Information Technology Mar. 2004/vol. 47, No. 3 Communications of the ACM Mar. 2004.
Valdis E. Krebs Uncloaking Terrorist Networks http://www.firstmonday.org/issues/issue7_4/krebs/Jan. 14, 2007.
Malik Magdon-Ismail Locating Hidden Groups in Communication Networks Using Hidden Markov Models http://citeseerxist.psu.edu/viewdoc/summary?doi=10.1.1. 7.8000 Feb. 15, 2003.
Matthew J. Dombroski NETEST: Estimating a Terrorist Network's Structure Graduate Student Best Paper Award, CASOS 2002 Conference 2002.
Naveen Santhapuri Identifying Hidden Deceiving Groups in Social networks Distributed Computing and Networking, 11th International Conference, ICDCN 2010 2006.
Sudarshan S. Chawathe Tracking Hidden Groups Using Communications Computer Science Department, University of Maryland, Lecture Notes in Computer Science vol. 2665 2003.
J. Baumes Discovering Hidden Groups in Communication Networks Lecture Notes in Computer Science vol. 3073 2004.
Sudhir Saxena, Application of Social Network Analysis (SNA) to Terrorist Networks in Jammu & Kashmir Strategic Analysis, vol. 28, No. 1, Jan.-Mar. 2004.
Hsinchun Chen and Fei-Yue Wang, Artificial Intelligence for Homeland Security IEEE Computer Society Sep./Oct. 2005.
J. Abibi and H. Chalupsky, Scalable group detection via a mutual information model First International Conference on Intelligence Analysis [IA-2005]2005, pp. 1-2.
J. C. Claussen, Offdiagnonal complexity: A computationally quick complexity measure for graphs and networks Physica A, 375, p. 365-373, 2007.
M. Crovella and E. D. Kolaczyk, Graph wavelets for spatial traffic analysis Proceedings of the IEEE Infocom 2003, 2003, pp. 1-10.
J. P. Crutchfield and K. Young, Inferring statistical complexity Phys. Rev. Lett., 63, p. 105-108, 1989.
W. Enders, Applied Econometrics Time Series, New York: John-Wiley & Sons, p. 138-151, 2004.
R. F. Engle, Autoregressive conditional heteroscedasticity with estimates of variance of United Kingdom inflation, Econometrica, 50, 987-1008, 1982.
L. Getoor and C. P. Diehl, Link mining: a survey, ACM SIGKDD Explorations Newsletter, 7, p. 3-12, 2005.
G. Gupta and J. Ghosh, Bregman bubble clustering: A robust, scalable framework for locating multiple, dense regions in data, ICDM 2006, 2006, pp. 1-12.
F. Gustafsson, The marginalized likelihood ratio test for detecting abrupt changes, IEEE Trans. on Automatic Control, 41, Issue 1, 1996, pp. 1-13.
K. Hovespian, P. Anselmo, and S. Mazumdar, Detection and prediction of relative clustered volatility in financial markets, Proc. of the 4th International Workshop on Computational Intelligence in Economics and Finance (CIFER), 2005, pp. 1-4.
A. K. Jain, M. N. Murity, and P. J. Flynn, Data Clustering: A review, ACM Computing Surveys, 31, p. 264-323, 1999.
I.T. Jolliffe Principal Component Analysis, Springer Series in Statistics, 2nd ed., Springer, NY, XXIX, 487, p. 28 2002.
H. Kantz and T. Schreiber Nonlinear Time Series Analysis, Cambridge: Cambridge University Press, p. 68 1997.
J. A. Hartigan and M. A. Wong a k-means clustering algorithm, Applied Statistics, 28, p. 100-108 1979.
J. Kubica, A. Moore, and J. Schneider Tractable group detection on large link data sets, The Third IEEE International Conference on Data Mining 2003, pp . 1-22.
F. Lekien, S. Shadden, J. Marsden Lagrangian coherent structures in n-dimensional systems, J. Math. Physics, 48, p. 065404 2007.
D. Margineantu, et al. Data Mining Methods for Anomaly Detection: KDD-2005 Workshop Report, ACM SIGKDD Explorations Newsletter, 7, Issue 2, p. 132-136 2005.
M. Nieto-Vesperinas Scattering and Diffraction in Physical Optics, 2nd ed., New York: John Wiley & Sons, p. 86-89, 1991.
A. Okabe, et al Spatial Tessellations—Concepts and Applications of Voronoi Diagrams, 2nd ed., New York: John Wiley, p. 224-228 2000.
G. Palla, I. Derenyi, I. Farkas, and T. Vicsek Uncovering the overlapping community structure of complex networks in nature and society, Nature, 435, p. 814 2005.
G. Palla, A-L. Barabasi, and T. Vicsek Quantifying social group evolution, Nature, 446, p. 664-667 2007.
A. Patcha and J.-M. Park an Overview of Anomaly Detection Techniques: Existing Solutions and Latest Technological Trends, Elsevier Computer Networks, 51, Issue 12, p. 3448-3470, 2007.
K. Renze and J. Oliver Generalized unstructured decimation, IEEE Computer Graphics and Applications, 16, p. 24-32 1996.
S. T. Roweis and L. K. Saul Nonlinear dimensionality reduction by locally linear embedding, Science, 290, p. 2323-2326 2000.
S. Shadden, F. Lekien, and J. Marsden Definition and properties of Lagrangian coherent structures from finite-time Lyapunov exponents in two-dimensional aperiodic flows, Physica D, 212, p. 271-304 2005.
S. Shadden Lagrangian coherent structures: Analysis of time-dependent dynamical systems using finite-time Lyapunov exponents (http://www.cds.caltech.edu/~shawn/LCS-tutorial/overview.html), Section 3 pp. 1-3.
C. R. Shalizi and K. L. Shalizi Blind construction of optimal nonlinear recursive predictors for discrete sequences, in M. Chickering and J. Halpern (eds.), Uncertainty in Artificial Intelligence: Proceedings of the Twentieth Conference, p. 504-511, 2004.
C. R. Shalizi, K. L. Shalizi, and R. Haslinger Quantifying self-organization with optimal predictors, Phys. Rev. Lett., 93, article 118701, 2004, pp. 1-4.
G. W. Stewart On the early history of the singular value decomposition, SIAM Review, 35, Issue 4, p. 551-566 1993.
J. Shi and J. Malik Normalized cuts and image segmentation, Proceedings of the 1997 Conference on Computer Vision and Pattern Recognition (CVPR '97), p. 731 1997.
J. Sun, Y. Xie, H. Zhang, and C. Faloutsos Less is more: Compact matrix decomposition for large sparse graphs, SIAM Data Mining, Minneapolis, MN, 2007, pp . 1-12.
R. Wilson, X. Bai, and E. Hancock Graph clustering using symmetric polynomials and locally linear embedding, British Machine Vision Conference, East Anglia, 2003, pp. 1.-10.
C. Ziehmann, L. A. Smith, and J. Kurths Localized Lyapunov exponents and the prediction of predictability, Phys. Lett. A, 4, p. 237-251, 2000.

\* cited by examiner

SYSTEMS AND METHODS FOR DYNAMIC ANOMALY DETECTION

I. BACKGROUND

The invention relates generally to the fields of data mining and data analysis. In particular, the invention relates to the process of detecting anomalies in heterogeneous, multivariate data sets that vary as functions of one or more independent variables.

The following is a list of documents that are referenced in the detailed description that is included herein.

References

J. Adibi and H. Chalupsky, "Scalable group detection via a mutual information model," *First International Conference on Intelligence Analysis [IA-2005]* (2005).

J. C. Claussen, "Offdiagonal complexity: A computationally quick complexity measure for graphs and networks," *Physica A,* 375, p. 365-373 (2007).

M. Crovella and E. D. Kolaczyk, "Graph wavelets for spatial traffic analysis," *Proceedings of the IEEE Infocom 2003* (2003).

J. P. Crutchfield and K. Young, "Inferring statistical complexity," *Phys. Rev. Lett.,* 63, p. 105-108 (1989).

W. Enders, Applied Econometrics Time Series, New York: John-Wiley & Sons, p. 139-149 (1995).

R. F. Engle, "Autoregressive conditional heteroscedasticity with estimates of variance of United Kingdom inflation," *Econometrica,* 50, 987-1008 (1982).

L. Getoor and C. P. Diehl, "Link mining: a survey," *ACM SIGKDD Explorations Newsletter,* 7, p. 3-12 (2005).

G. Gupta and J. Ghosh, "Bregman bubble clustering: A robust, scalable framework for locating multiple, dense regions in data," *ICDM 2006* (2006).

F. Gustafsson, "The marginalized likelihood ratio test for detecting abrupt changes," *IEEE Trans. on Automatic Control,* 41, Issue 1 (1996).

K. Hovsepian, P. Anselmo, and S. Mazumdar, "Detection and prediction of relative clustered volatility in financial markets," *Proc. of the 4th International Workshop on Computational Intelligence in Economics and Finance (CIFER)* (2005).

A. K. Jain, M. N. Murty, and P. J. Flynn, "Data clustering: A review," *ACM Computing Surveys,* 31, p. 264-323 (1999).

I. T. Jolliffe, *Principal Component Analysis*, Springer Series in Statistics, 2nd ed., Springer, N.Y., XXIX, 487, p. 28 (2002).

H. Kantz and T. Schreiber, *Nonlinear Time Series Analysis*, Cambridge: Cambridge University Press (1997).

J. A. Hartigan and M. A. Wong, "A k-means clustering algorithm," *Applied Statistics,* 28, p. 100-108 (1979).

S. Kramer, "System and method for analyzing dynamics of communications in a network," U.S. patent application Ser. No. 11/534,206 (2006).

J. Kubica, A. Moore, and J. Schneider, "Tractable group detection on large link data sets," *The Third IEEE International Conference on Data Mining* (2003).

F. Lekien, S. Shadden, J. Marsden, "Lagrangian coherent structures in n-dimensional systems," *J. Math. Physics,* 48, p. 065404 (2007).

D. Margineantu, et al., "Data Mining Methods for Anomaly Detection: KDD-2005 Workshop Report," *ACM SIGKDD Explorations Newsletter,* 7, Issue 2, p. 132-136 (2005).

M. Nieto-Vesperinas, *Scattering and Diffraction in Physical Optics*, 2nd ed., New York: John Wiley & Sons (1991).

A. Okabe, et al., *Spatial Tessellations—Concepts and Applications of Voronoi Diagrams*, 2nd ed., New York: John Wiley (2000).

G. Palla, I. Derenyi, I. Farkas, and T. Vicsek, "Uncovering the overlapping community structure of complex networks in nature and society," *Nature,* 435, p. 814 (2005).

G. Palla, A-L. Barabasi, and T. Vicsek, "Quantifying social group evolution," *Nature,* 446, p. 664-667 (2007).

A. Patcha and J.-M. Park, "An Overview of Anomaly Detection Techniques: Existing Solutions and Latest Technological Trends," *Elsevier Computer Networks,* 51, Issue 12, p. 3448-3470 (2007).

K. Renze and J. Oliver, "Generalized unstructured decimation," *IEEE Computer Graphics and Applications,* 16, p. 24-32 (1996).

S. T. Roweis and L. K. Saul, "Nonlinear dimensionality reduction by locally linear embedding," *Science,* 290, p. 2323-2326 (2000).

S. Shadden, F. Lekien, and J. Marsden, "Definition and properties of Lagrangian coherent structures from finite-time Lyapunov exponents in two-dimensional aperiodic flows," Physica D, 212, p. 271-304 (2005).

S. Shadden, "Lagrangian coherent structures: Analysis of time-dependent dynamical systems using finite-time Lyapunov exponents" (http://www.eds.caltech.edu/~shawn/LCS-tutorial/overview.html).

C. R. Shalizi and K. L. Shalizi, "Blind construction of optimal nonlinear recursive predictors for discrete sequences," in M. Chickering and J. Halpern (eds.), *Uncertainty in Artificial Intelligence: Proceedings of the Twentieth Conference*, p. 504-511 (2004).

C. R. Shalizi, K. L. Shalizi, and R. Haslinger, "Quantifying self-organization with optimal predictors," *Phys. Rev. Lett.,* 93, article 118701 (2004).

G. W. Stewart, "On the early history of the singular value decomposition," *SIAM Review,* 35, Issue 4, p. 551-566 (1993).

J. Shi and J. Malik, "Normalized cuts and image segmentation," *Proceedings of the 1997 Conference on Computer Vision and Pattern Recognition (CVPR '97)*, p. 731 (1997).

J. Sun, Y. Xie, H. Zhang, and C. Faloutsos, "Less is more: Compact matrix decomposition for large sparse graphs," *SIAM Data Mining*, Minneapolis, Minn. (2007).

R. Wilson, X. Bai, and E. Hancock, "Graph clustering using symmetric polynomials and locally linear embedding," *British Machine Vision Conference*, East Anglia (2003).

C. Ziehmann, L. A. Smith, and J. Kurths, "Localized Lyapunov exponents and the prediction of predictability," *Phys. Lett. A,* 4, p. 237-251 (2000).

II. SUMMARY

In one respect, disclosed is a method for detecting anomalies in data sets that are functions of one or more independent variables, the method comprising: computing components of one or more types of feature vectors at a plurality of values of one or more independent variables, each type of the feature vectors characterizing a set of input data being dependent on the one or more independent variables; computing one or more types of output values corresponding to each type of feature vectors as a function of the one or more independent variables using a nonlinear sequence analysis method; and detecting anomalies in how the one or more types of output values change as functions of the one or more independent variables.

In another respect, disclosed is an information-handling system for detecting anomalies in data sets that vary as functions of one or more independent variables, the system comprising: one or more memory units; one or more processor units; and one or more input/output devices, wherein the system is operable to: compute components of one or more types of feature vectors at a plurality of values of one or more independent variables, each type of the feature vectors characterizing a set of input data being dependent on the one or more independent variables; compute one or more types of output values corresponding to each type of feature vectors as a function of the one or more independent variables using nonlinear sequence analysis methods; and detect anomalies in how the one or more types of output values change as functions of the one or more independent variables.

In yet another respect, disclosed is a computer program product stored on a computer-operable medium, the computer program product comprising software code being effective to compute components of one or more types of feature vectors at a plurality of values of one or more independent variables, each type of the feature vectors characterizing a set of input data being dependent on the one or more independent variables; compute one or more types of output values corresponding to each type of feature vectors as a function of the one or more independent variables using nonlinear sequence analysis methods; and detect anomalies in how the one or more types of output values change as functions of the one or more independent variables.

Numerous additional embodiments are also possible.

III. BRIEF DESCRIPTION OF THE DRAWINGS

Other objects and advantages of the invention may become apparent upon reading the detailed description and upon reference to the accompanying drawings.

Figure 1:
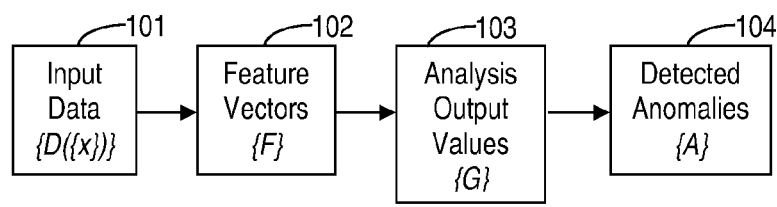
FIG. 1 is a diagram showing some example sets of mathematical variables used herein, ordered according to a typical processing flow, in accordance with some embodiments.

While the invention is subject to various modifications and alternative forms, specific embodiments thereof are shown by way of example in the drawings and the accompanying detailed description. It should be understood, however, that the drawings and detailed description are not intended to limit the invention to the particular embodiment. This disclosure is instead intended to cover all modifications, equivalents, and alternatives falling within the scope of the present invention as defined by the appended claims.

IV. DETAILED DESCRIPTION

One or more embodiments of the invention are described below. It should be noted that these and any other embodiments are exemplary and are intended to be illustrative of the invention rather than limiting. While the invention is widely applicable to different types of systems, it is impossible to include all of the possible embodiments and contexts of the invention in this disclosure. Upon reading this disclosure, many alternative embodiments of the present invention will be apparent to persons of ordinary skill in the art.

Note: Throughout the following descryiption, "ex:" stands for "for example."

The field of anomaly detection research spans work in a broad range of scientific disciplines, including applied mathematics, statistics, physics, computer science, data mining, engineering, and artificial intelligence. For recent reviews of anomaly detection research, consult the following publications:

A. Patcha and J.-M. Park, "An Overview of Anomaly Detection Techniques: Existing Solutions and Latest Technological Trends," *Elsevier Computer Networks*, 51, Issue 12, p. 3448-3470 (2007).

D. Margineantu, et al., "Data Mining Methods for Anomaly Detection: KDD-2005 Workshop Report," *ACM SIGKDD Explorations Newsletter*, 7, Issue 2, p. 132-136 (2005).

At a high level, the types of anomaly detection methods include rule-based techniques such as transaction profiling; statistical methods such as probabilistic Bayesian model; clustering/outlier-detection approaches; machine learning methods, such as neural networks, hidden Markov models (HMMs), and support vector machines; and miscellaneous techniques from other disciplines.

Some important sample applications of anomaly detection methods include financial fraud prevention (for example, in credit card payment processing), telephone fraud prevention, military battlespace awareness, surveillance for disease outbreaks or chemical or biological weapons, counterterrorism data mining programs, computer antivirus systems, anti-spam systems, computer network intrusion detection and prevention systems, and search engine optimization (SEO) fraud detection.

At a high level, the present methods and systems for anomaly detection could comprise the following steps, in accordance with some embodiments:

Feature vector encoding: Computing components of one or more types of feature vectors at a plurality of values of one or more independent variables, each type of the feature vectors characterizing a set of input data being dependent on the one or more independent variables.

Nonlinear sequence analysis: Compute one or more types of output values corresponding to each type of feature vectors as a function of the one or more independent variables using nonlinear sequence analysis methods; and Anomaly detection: Detect anomalies in how the one or more types of output values change as functions of the one or more independent variables.

In the feature vector encoding step above, the independent variables could represent any desired mathematical quantities. Some typical examples include time, spatial coordinates, frequency, and scaling parameters, in accordance with some embodiments.

Figure 14:
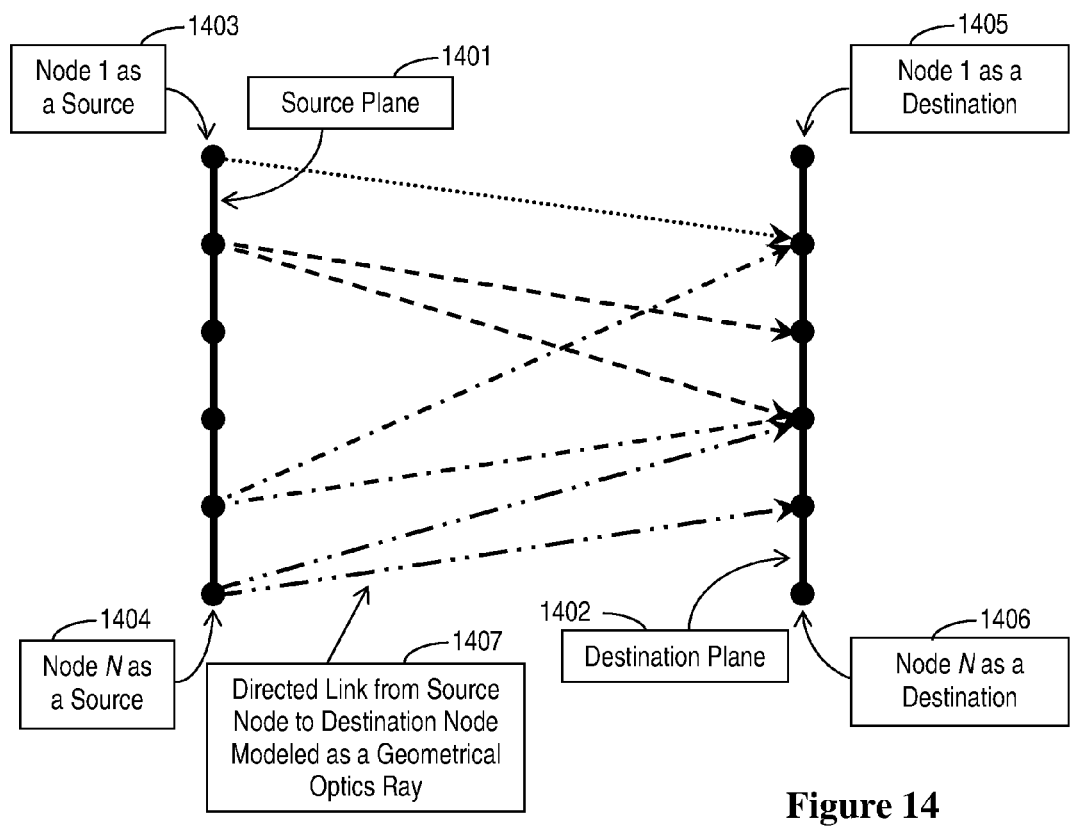
FIG. 14 is a diagram illustrating a method for calculating feature vectors for an input data set of a weighted, directed graph by using geometrical optics and an angular spectrum decomposition, in accordance with some embodiments.

There are many possible methods and techniques that could be used to perform the feature vector encoding process mentioned above, in accordance with some embodiments. Possible methods include, but are not limited to, the following:

singular value decomposition (SVD) [Stewart],
principal component analysis (PCA) [Jolliffe],
locally linear embedding (LLE) [Roweis],
compact matrix decomposition [Sun],
graph wavelets [Crovella],
geometrical optics/angular spectrum encoding [refer to the description for FIG. 14],
mediated communications statistics [Kramer], and
"causal states" statistical complexity [Shalizi].

Optional preprocessing methods could be applied to the source input data sets prior to the subsequent nonlinear sequence analysis and anomaly detection steps, in accordance with some embodiments. A few typical examples of preprocessing techniques include normalizing the input data; time-weighting the input data using a general sliding-time-window kernel; and calculating standard statistical measures of the input data, such as Gaussian, Chi-squared, and normal distributions. Many other standard preprocessing techniques would be evident to those of ordinary skill in the art.

Some possible nonlinear sequence analysis methods include nonlinear time series analysis techniques such as calculating finite-time Lyapunov exponents (FTLEs) (ex: 802) [Lekien] [Shadden] [Ziehmann], off-diagonal complexity (ex: 803) [Claussen], and temporal correlations (ex: 804) [Kantz], in accordance with some embodiments. It should be noted that in such uses of nonlinear time series analysis techniques, any of the general independent variables under consideration could be effectively treated as the time variable.

In the anomaly detection step, the process of monitoring for uncharacteristic changes in results generated using the nonlinear sequence analysis methods could be performed by one or more of the following methods, in accordance with some embodiments:

manual, visual inspection of one or more graphs of the results by a person
automated analysis using derivatives of the results
automated analysis using statistical moments of the results
automated analysis using Fourier decomposition of the results
automated analysis methods using machine learning classifiers, in general
automated analysis methods using binary decision trees
automated analysis methods using neural networks
automated analysis methods using support vector machines
automated analysis methods using Bayesian classifiers
automated analysis methods using associative memories Numerous other appropriate techniques would be evident to those of ordinary skill in the art.

A further important preprocessing example for the present methods and/or systems is to subdivide an input data set into component clusters, which might overlap or instead be distinct, in accordance with some embodiments. Each cluster could then be processed individually and simultaneously. The nonlinear sequence analysis and anomaly detection results could be then compared across clusters. One important benefit of this multi-cluster scenario is that the methods and systems for anomaly detection would enable the user to answer this type of question: Which of the clusters are behaving or evolving differently than the others in the data set?

In the multi-cluster scenario, any of the following methods could be used in the anomaly detection step, in accordance with some embodiments. Numerous other approaches would be evident to those of ordinary skill in the art cluster analysis using a distance metric to calculate distances among the results for the clusters and then flagging outliers that exceed a threshold distance
cross-outlier detection
particle-tracking methods that trace the clusters' movements and then flag outliers that do not move in a direction similar to that of their neighboring clusters It is important to note that the methods and systems described herein can be applied to any type of general input data set. For example, the input data could comprise one or more of the following types: discrete data, continuous data, scalar data, vector data, tensor data, multi-dimensional data, linear data, nonlinear data, analog data, digital data, deterministic data, stochastic data, chaotic data, stationary data, and non-stationary data, in accordance with some embodiments.

Also, the source or origin of the input data is completely general as well. For example, the input data could be of one or more of the following origins: mathematical data, physical data, chemical data, biological data, mechanical data, geological data, meteorological data, medical data, electrical data, economics data, image data, video data, sound data, radar data, sonar data, hyperspectral data, communications data, electronic mail records, telephone call records, instant-message records, financial transactions, shipping transactions, travel records, textual data, cyber network traffic data, online search engine results, and relational database tables, in accordance with some embodiments.

FIG. 1 is a figure showing some example sets of mathematical variables used herein, ordered according to a typical processing flow, in accordance with some embodiments. In one embodiment as shown in FIG. 1, an input data set $\{D(\{x\})\}$ (ex: 101), which is a function of one or more independent variables $\{x\}$, which is used to calculate a plurality of feature vectors $\{F\}$ (ex: 102). These feature vectors $\{F\}$ are then used to calculate a plurality of analysis output values $\{G\}$ (ex: 103), which are subsequently employed to generate a plurality of detected anomalies $\{A\}$ (ex: 104).

Figure 2:
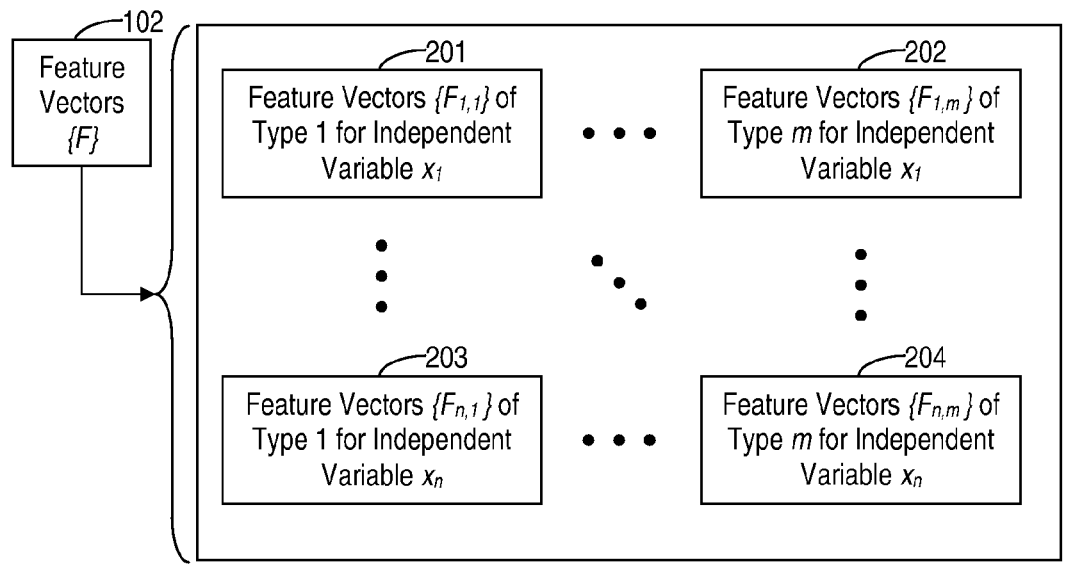
FIG. 2 is a diagram showing examples of different types of feature vectors as functions of different independent variables, in accordance with some embodiments.

FIG. 2 is a diagram illustrating how the plurality of feature vectors $\{F\}$ (ex: 102) can be separated into a two-dimensional matrix representation of feature vectors $\{F_{i,j}\}$ of m different types, each one viewed as a function of one of the plurality of n independent variables, in accordance with some embodiments. For example, $\{F_{1,1}\}$ (ex: 201) represents the plurality of feature vectors of type 1 for independent variable $x_1$. At the right side of the first row, $\{F_{1,m}\}$ (ex: 202) represents the plurality of feature vectors of type m for independent variable $x_1$. At the bottom of the first column, $\{F_{n,1}\}$ (ex: 203) represents the plurality of feature vectors of type 1 for independent variable $x_n$. Similarly, $\{F_{n,m}\}$ (ex: 204) represents the plurality of feature vectors of type m for independent variable $x_n$.

Figure 3:
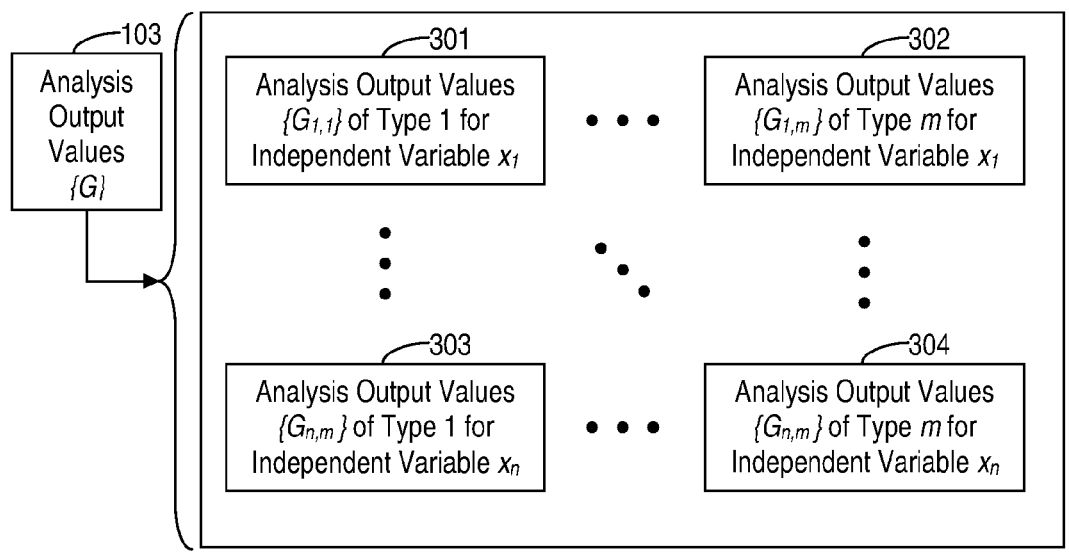
FIG. 3 is a diagram showing examples of different types of analysis output values as functions of different independent variables, in accordance with some embodiments.

FIG. 3 is a diagram illustrating how the plurality of analysis output values $\{G\}$ (ex: 103) can be separated into a two-dimensional matrix representation of analysis output values $\{G_{i,j}\}$ of m different types, each one viewed as a function of one of the plurality of n independent variables, in accordance with some embodiments. For example, $\{G_{1,1}\}$ (ex: 301) represents the plurality of analysis output values for feature vector type 1 for independent variable $x_1$. At the right side of the first row, $\{G_{1,m}\}$ (ex: 302) represents the plurality of analysis output values for feature vector type m for independent variable $x_1$. At the bottom of the first column, $\{G_{n,1}\}$ (ex: 303) represents the plurality of analysis output values for feature vector type 1 for independent variable $x_n$. Similarly, $\{G_{n,m}\}$ (ex: 304) represents the plurality of analysis output values for feature vector type m for independent variable $x_n$.

Figure 4:
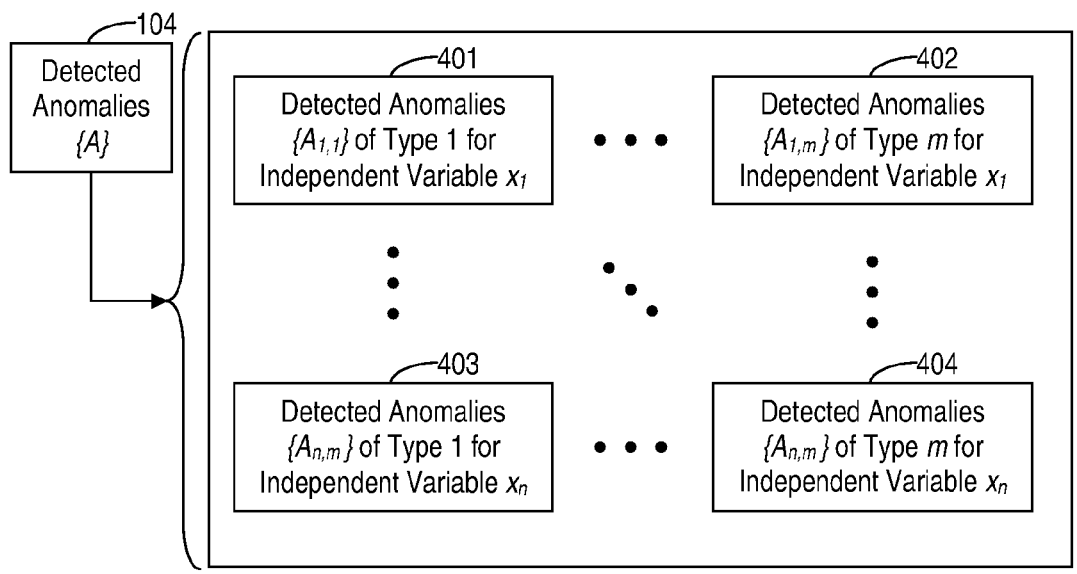
FIG. 4 is a diagram showing examples of different types of detected anomalies as functions of different independent variables, in accordance with some embodiments.

FIG. 4 is a diagram illustrating how the plurality of detected anomalies $\{A\}$ (ex: 104) can be separated into a two-dimensional matrix representation of detected anomalies $\{A_{i,j}\}$ of m different types, each one viewed as a function of one of the plurality of n independent variables, in accordance with some embodiments. For example, $\{A_{1,1}\}$ (ex: 401) represents the plurality of detected anomalies for feature vector type 1 for independent variable $x_1$. At the right side of the first row, $\{A_{1,m}\}$ (ex: 402) represents the plurality of detected anomalies for feature vector type m for independent variable $x_1$. At the bottom of the first column, $\{A_{n,1}\}$ (ex: 403) represents the plurality of detected anomalies for feature vector type 1 for independent variable $x_n$. Similarly, $\{A_{n,m}\}$ (ex: 404) represents the plurality of detected anomalies for feature vector type m for independent variable $x_n$.

Figure 5:
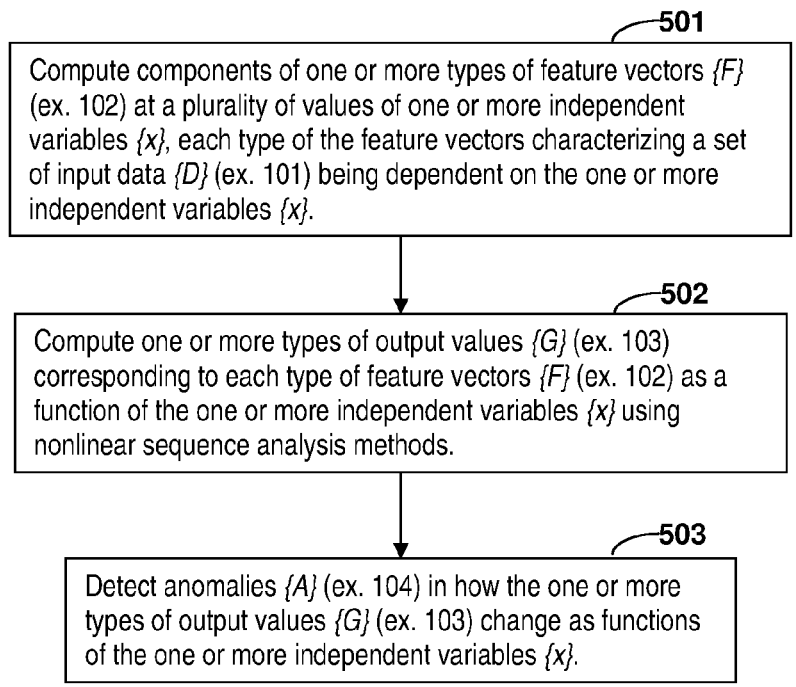
FIG. 5 is a flowchart diagram illustrating a method for detecting anomalies by computing feature vectors, computing analysis output values using nonlinear sequence analysis methods, and detecting anomalies based on the analysis output values, in accordance with some embodiments.

FIG. 5 is a flowchart diagram illustrating a method for detecting anomalies by computing feature vectors, computing analysis output values using nonlinear sequence analysis methods, and detecting anomalies based on the analysis output values, in accordance with some embodiments, including:

- Block 501: Compute components of one or more types of feature vectors $\{F\}$ (ex. 102) at a plurality of values of one or more independent variables $\{x\}$, each type of the feature vectors characterizing a set of input data $\{D\}$ (ex. 101) being dependent on the one or more independent variables $\{x\}$.
- Block 502: Compute one or more types of output values $\{G\}$ (ex. 103) corresponding to each type of feature vectors $\{F\}$ (ex. 102) as a function of the one or more independent variables $\{x\}$ using nonlinear sequence analysis methods.
- Block 503: Detect anomalies $\{A\}$ (ex. 104) in how the one or more types of analysis output values $\{G\}$ (ex. 103) change as functions of the one or more independent variables $\{x\}$.

Figure 6:
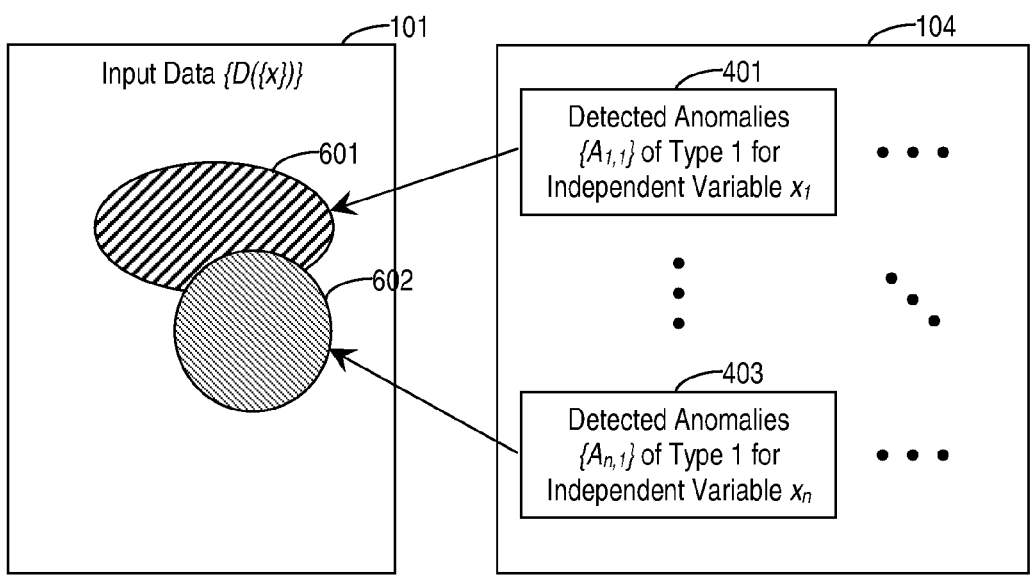
FIG. 6 is a diagram illustrating how detected anomalies can be mapped back to the subsets of the original input data sets that caused the anomalies, in accordance with some embodiments.

FIG. 6 is a diagram illustrating how detected anomalies can be mapped back to the subsets of the original input data sets that caused the anomalies, in accordance with some embodiments. For example, the detected anomalies $\{A_{1,1}\}$ (ex: 401), based on feature vector type 1 for independent variable $x_1$, can be mapped back to a subset (ex: 601) of the original input data set $\{D(\{x\})\}$ (ex: 101). Similarly, the detected anomalies $\{A_{n,m}\}$ (ex: 402), based on feature vector type 1 for independent variable $x_n$, can be mapped back to a different subset (ex: 602) of the original input data set $\{D(\{x\})\}$ (ex: 101). In each case, the process for the reverse mapping depends on the type of feature vector encoding method previously applied to yield each set of anomalies.

Figure 7:
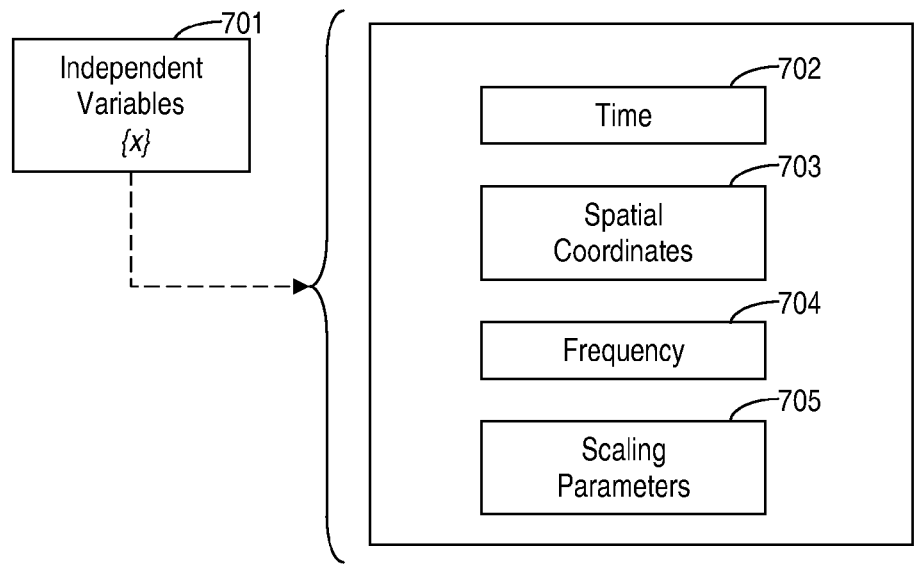
FIG. 7 is a diagram showing examples of different types of independent variables upon which an input data set might depend, in accordance with some embodiments.

FIG. 7 is a diagram showing examples of different types of independent variables (ex: 701) upon which an input data set $\{D(\{x\})\}$ (ex: 101) might depend, in accordance with some embodiments. Typical examples include time (ex: 702); spatial coordinates (ex: 703); frequency (ex: 704); and scaling parameters (ex: 705), such as those associated with wavelet decompositions.

Figure 8:
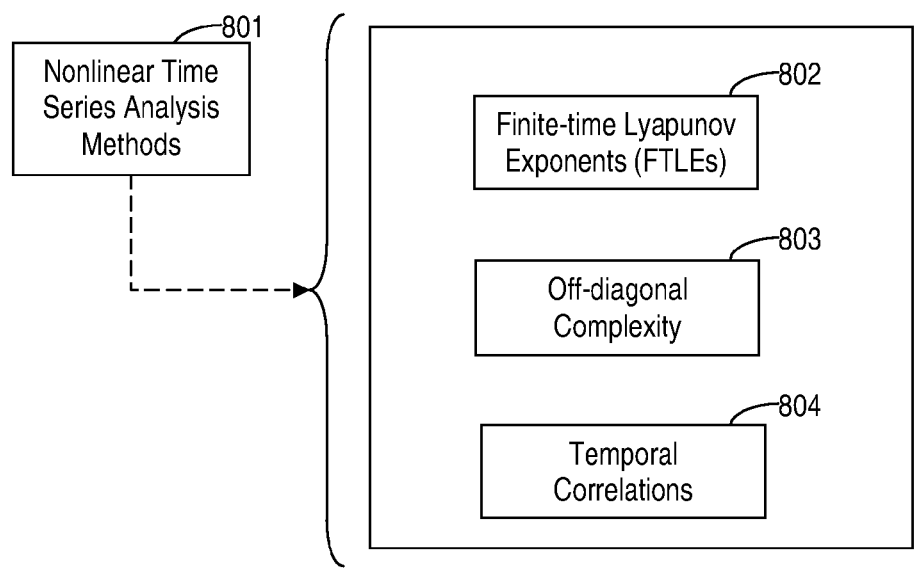
FIG. 8 is a diagram showing examples of different types of nonlinear time series analysis methods that could be used to calculate analysis output values, in accordance with some embodiments.

FIG. 8 is a diagram showing examples of different types of nonlinear time series analysis methods (ex: 801) that could be used to calculate analysis output values $\{G\}$ (ex. 103), in accordance with some embodiments. Key example methods mentioned previously include those that calculate finite-time Lyapunov exponents (FTLEs) (ex: 802) [Lekien] [Shadden] [Ziehmann], off-diagonal complexity (ex: 803) [Claussen], and temporal correlations (ex: 804) [Kantz].

The finite-time Lyapunov exponent σ is a scalar value that characterizes the amount of stretching in a dynamical system about an initial point during a time interval of finite length. σ provides information about the local stability and predictability of a dynamical system. The equations below define σ in terms of the Jacobian matrix of the flow map φ, where $\vec{x}_0$ is the dynamical system's initial state vector at time $t_0$, T is an integration time interval, and $\lambda_{max}$ is the maximum eigenvalue of Δ:

$$\Delta = \frac{d\phi_{t_0}^{t_0+T}(\vec{x}_0)}{d\vec{x}} * \frac{d\phi_{t_0}^{t_0+T}(\vec{x}_0)}{d\vec{x}}$$

$$\sigma_{t_0}^T(\vec{x}) = \frac{1}{T}\ln\sqrt{\lambda_{max}(\Delta)}$$

Refer to the online tutorial "Lagrangian coherent structures: Analysis of time-dependent dynamical systems using finite-time Lyapunov exponents" by Shawn Shadden (http:// www.cds.caltech.edu/~shawn/LCS-tutorial/overview.html) for further details on FTLE definitions and calculations. The framework of FTLEs has recently been extended to higher-dimensional systems by Lekien, et al. One of the key innovations of the present invention is the interpretation of the components of a feature vector F as the components of the dynamical system's state vector $\vec{x}$. It should be noted that even though the FTLE definition cited above is based on performing an integration over a time variable t, said variable t can be interpreted equally well as any arbitrary independent variable, as noted in the description of FIG. 19.

Off-diagonal complexity [Claussen] is a complexity measure for undirected graphs based on a node-node link cross-distribution entropy calculation. It has relatively low values for random graphs and increases in value for more complex structures like scale-free networks and hierarchical trees.

A range of temporal correlations in nonlinear dynamical systems [Kantz] can be used as feature vectors themselves and to calculate additional measures, such as self-organized criticality.

Figure 9:
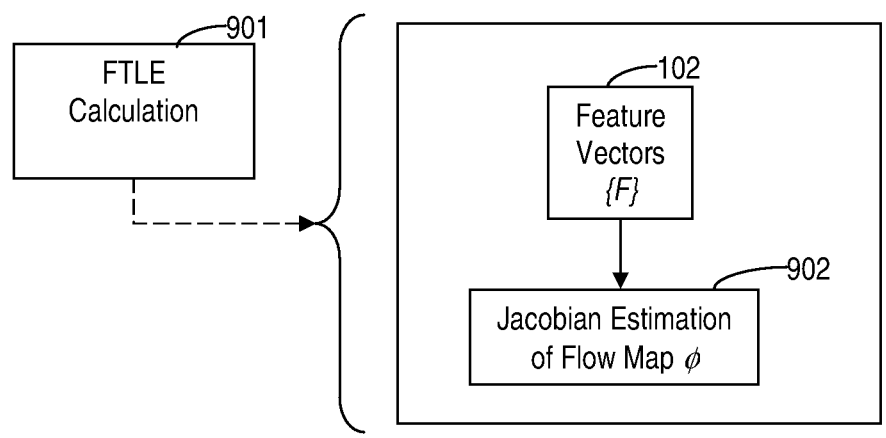
FIG. 9 is a flowchart diagram illustrating a method for passing a set of input features vectors into a method for estimating the Jacobian matrix of the flow map that describes the evolution of said feature vectors, in accordance with some embodiments.

FIG. 9 is a flowchart diagram illustrating a method for FTLE calculation (ex: 901) for passing a set of input features vectors {F} (ex: 102) into a method (ex. 902) for estimating the Jacobian matrix of the flow map $\phi$ that describes the evolution of said feature vectors, in accordance with some embodiments. Within this analysis framework, the state of the dynamical system at each value of the independent variable is defined by the feature vector F. The feature vector F of the dynamical system can be interpreted as a pseudo-"position" vector within the state space spanned by all possible values of the components of the feature vector F.

As one example, suppose that F consists of the three greatest singular values calculated by singular value decomposition of the input data, F={$s_1,s_2,s_3$}. In this case, the triplet {$s_1,s_2,s_3$} can be viewed as the position of the dynamical system within an abstract three-dimensional space spanned by the possible values of three maximal singular values.

Figure 10:
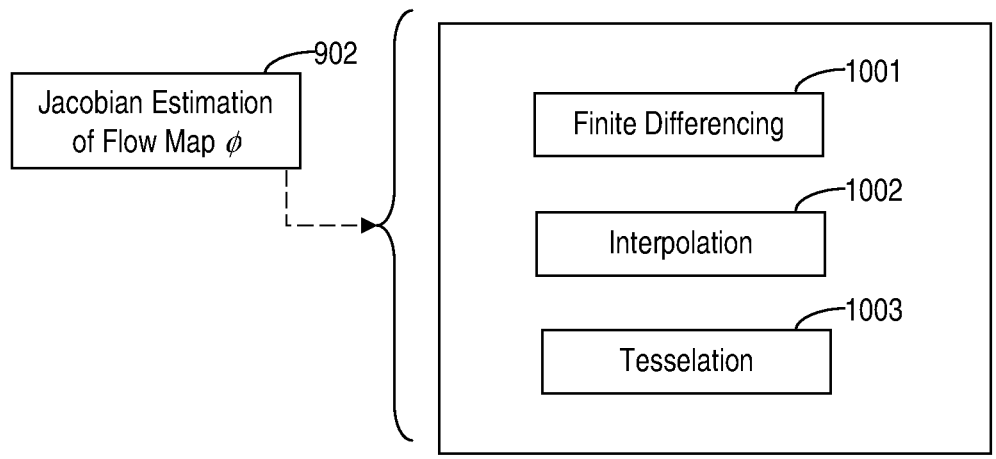
FIG. 10 is a diagram showing examples of different techniques for estimating the Jacobian matrix of the flow map described in FIG. 9, in accordance with some embodiments.

FIG. 10 is a diagram showing examples of different techniques for estimating the Jacobian matrix of the flow map $\phi$ described in FIG. 9, in accordance with some embodiments, including:

Block 1001: The following type of finite differencing approach can be employed to estimate the (i,j) component of the Jacobian matrix of the flow map $\phi$.

$$\left(\frac{d\phi_{t_0}^{t_0+T}(\vec{x}_0)}{d\vec{x}}\right)_{i,j} \approx \frac{(\vec{x}_{i+1}-\vec{x}_i)\cdot\hat{e}_i}{(\vec{x}_i-\vec{x}_{i-1})\cdot\hat{e}_j}$$

In the formula given above, the index i indicates the $i^{th}$ successive value of the $j^{th}$ component of the state vector $\vec{x}$, and the ê variables denote unit vectors in the direction of the corresponding component of the state vector. While the approximation above assumes a uniform sampling of the independent variable, a non-uniform spacing of the independent variables can be accommodated in the usual fashion by proportional weightings of the finite differences, as is well-known to practitioners of numerical differentiation. Higher-order finite differencing schemes using more than three samples could also be used, if desired. Also, in practice, it is frequently desirable to perform a conditioning step upon the matrix generated using the formula above by eliminating rows and columns that are completely null (that is, consisting entirely of zeroes).

Block 1002: In conjunction with finite differencing, interpolation schemes, such as those using splines or Voronoi-based methods [Okabe], could be used to interpolate values of state vectors as part of the process of estimating the Jacobian matrix of the flow map.

Block 1003: In conjunction with finite differencing, multidimensional approaches for tessellation in higher dimensions [Renze] could likewise be employed to interpolate values of state vectors as part of the process of estimating the Jacobian matrix of the flow map.

The Jacobian matrix estimation techniques noted above are examples for illustrative purposes only. Additional approximation methods would be evident to persons of ordinary skill in the art. Selecting one or more appropriate estimation techniques would depend on the nature of the source data to be analyzed and the goals of the analysis.

Figure 11:
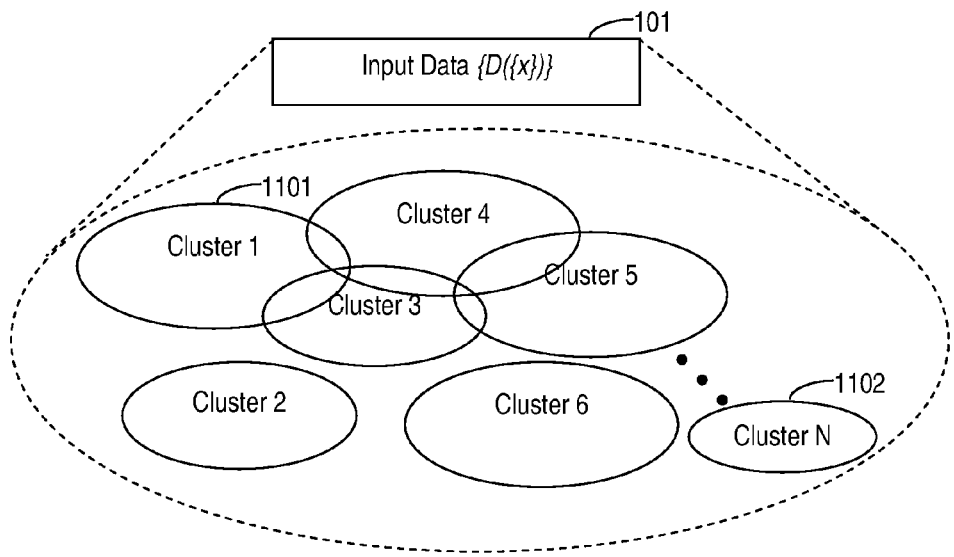
FIG. 11 is a diagram showing an example of an input data set being subdivided into component clusters, which might overlap or instead be distinct, in accordance with some embodiments.

The next step in the present invention is that of optionally separating the input data to be analyzed into clusters, or segments. FIG. 11 is a diagram showing an example of an input data set {D({x})} (ex: 101), being subdivided into component clusters, which might overlap or instead be distinct, in accordance with some embodiments. In this figure, there are a total of N clusters, comprising Cluster 1 (ex: 1101) through Cluster N (ex. 1102). Each data point in the input data set {D({x})} is contained within in at least one cluster and can also be a member of multiple clusters, depending upon the clustering technique applied.

Many clustering methods are known and used by practitioners of data mining. A few notable examples include the following techniques:

Hierarchical clustering [Jain]
Spectral clustering [Shi]
k-means [Hartigan]
Mutual information [Adibi]
k-groups/GDA [Kubica]
Clique percolation [Palla]
Bregman bubbles [Gupta]
Locally linear embedding (LLE) [Wilson]

Figure 12:
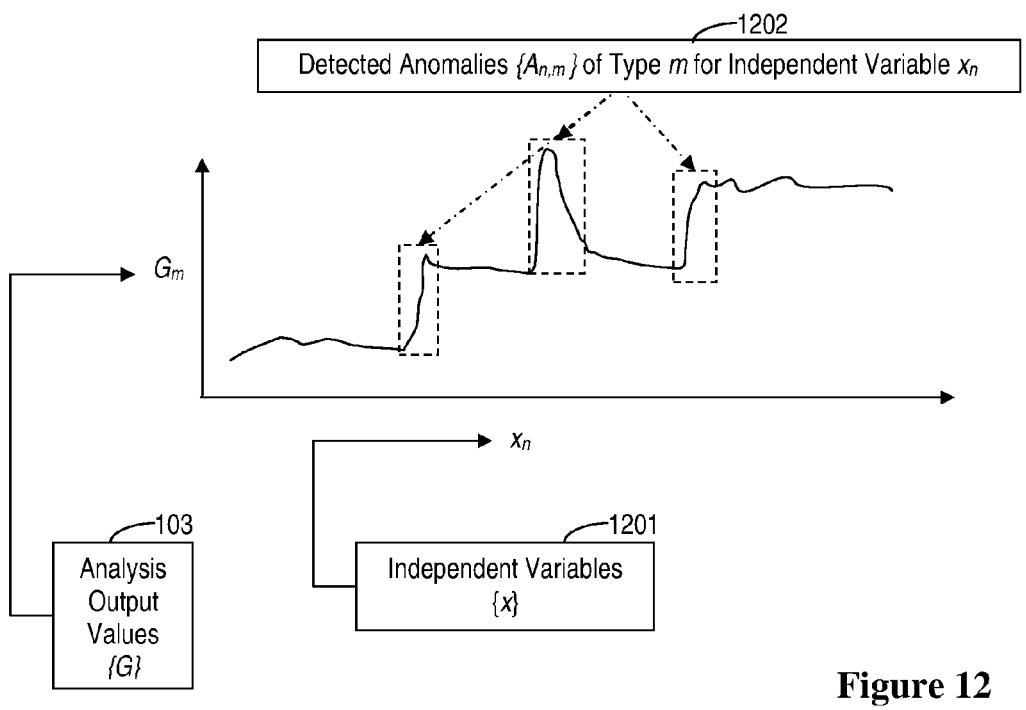
FIG. 12 is a diagram showing an example of detecting the anomalies by monitoring for uncharacteristic changes in the analysis output results generated using nonlinear sequence analysis methods, in accordance with some embodiments.

FIG. 12 is a diagram showing an example of detecting the anomalies by monitoring for uncharacteristic changes in the analysis output results generated using nonlinear sequence analysis methods, in accordance with some embodiments. In this figure, the analysis output values {$G_m$} (ex: 103) that result from the analysis of the feature vectors {$F_m$} of type m are graphed as a function of $x_n$, one of the independent variables {x} (ex: 1201). The detected anomalies {$A_{n,m}$} (ex: 103) are identified as uncharacteristic changes in the sequence of $G_m$ values. Possible methods for automatically detecting these changes in $G_m$ include, but are not limited to, the following:

Setting a threshold for the magnitude of the derivative of $G_m$ with respect to $x_n$ and flagging values that exceed the defined threshold Applying the Marginalized Likelihood Ratio Test (MLR) test [Gustafsson] to detect uncharacteristic changes in $G_m$ Employing time series analysis models such as Autoregressive Moving Average (ARMA) [Enders] or Generalized Autoregressive Conditional Heteroscedasticity (GARCH) [Engle] models to detect unusual occurrences of volatility in $G_m$, where the arbitrary independent variable $x_n$ is treated as the time variable The techniques noted above are examples for illustrative purposes only. Additional change detection methods would be evident to persons of ordinary skill in the art.

Figure 13:
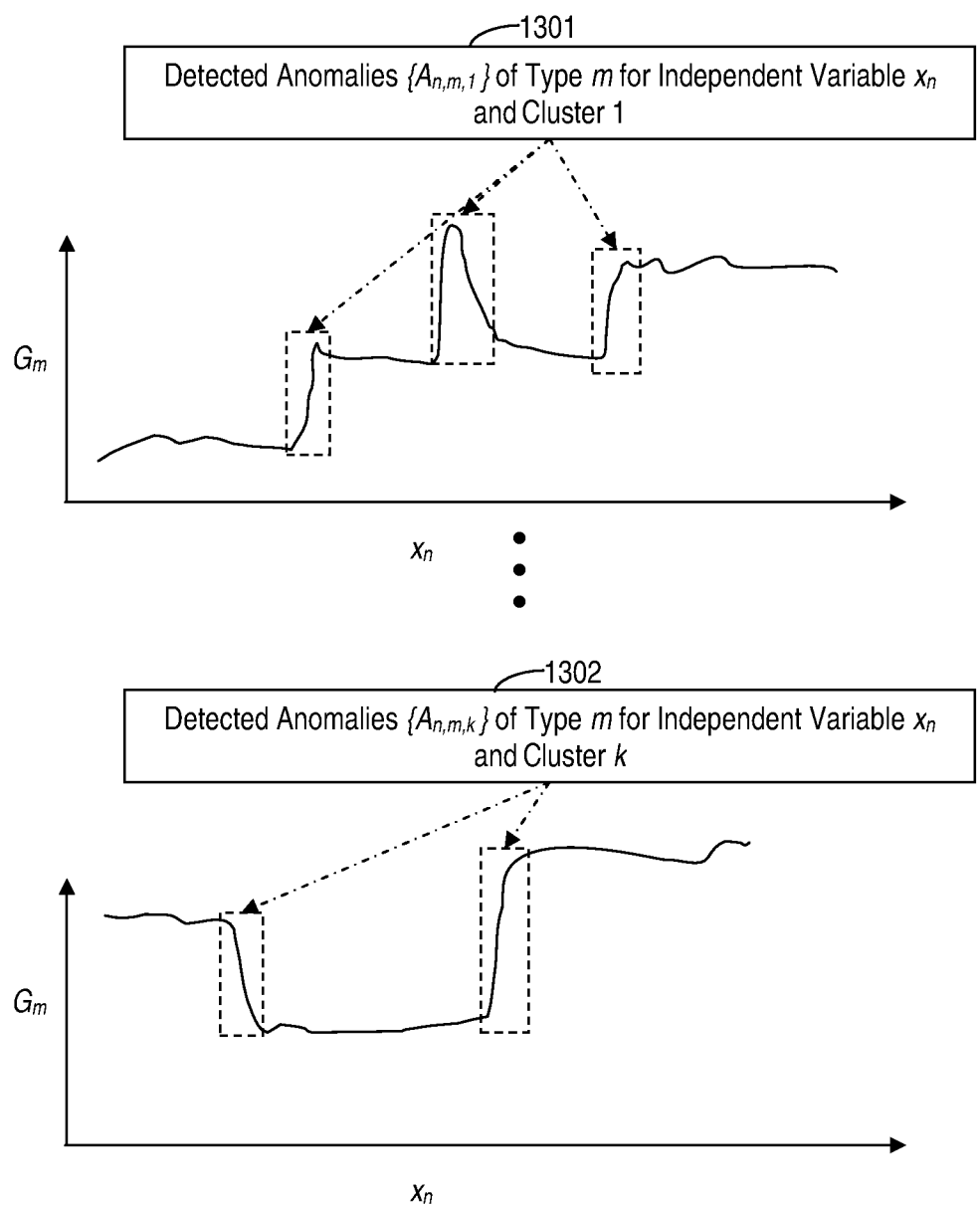
FIG. 13 is a diagram showing an example of detecting the anomalies by monitoring for uncharacteristic changes in the analysis output results generated using the nonlinear sequence analysis methods across the plurality of clusters described in FIG. 10, in accordance with some embodiments.

FIG. 13 is a diagram showing an example of detecting the anomalies by monitoring for uncharacteristic changes in the analysis output results generated using the nonlinear sequence analysis methods across the plurality of clusters described in FIG. 10, in accordance with some embodiments. The change detection process described above for FIG. 12 can be applied to the plurality of clusters into which the input data set {D({x})} (ex: 101) has been separated. FIG. 13 shows two example plots of $G_m$, which result in two corresponding sets of detected anomalies:

Block 1301: Detected anomalies $\{A_{n,m,l}\}$ of type m for independent variable $x_n$ and cluster 1

Block 1302: Detected anomalies $\{A_{n,m,k}\}$ of type m for independent variable $x_n$ and cluster k FIG. 14 is a diagram illustrating a method for calculating feature vectors for an input data set the input data set {D({x})} (ex: 101) comprising a weighted, directed graph by using geometrical optics and an angular spectrum decomposition, in accordance with some embodiments. This feature vector encoding method comprises the following steps:

Load a network graph input data set comprising weighted, directed links between N nodes, with each directed link starting at a labeled source node and terminating at a labeled destination node. Such a data set should comprise, at a minimum, sets of ordered triples in form of (source_node_ID, destination_node_ID, w), in which w is the numeric weight between the link between the source node labeled by source_node_ID and the destination node labeled by destination_node_ID.

Arrange the labeled source nodes (Node 1 (ex: 1403) through Node N (ex: 1401)) along a source plane (ex: 1401) in a modeled mathematical space.

Arrange the labeled destination nodes (Node 1 (ex: 1405) through Node N (ex: 1406)) along a distinct, destination plane (ex: 1402) in the modeled mathematical space.

Represent the directed links (ex: 1407) as geometrical optics rays that emanate from source nodes on the source plane to the destination nodes on the destination plane scaled by the corresponding weights {w} of the directed links.

Evaluate the resultant wave field $\psi(y)$ on the destination plane as the complex summation of the contributions of the modeled geometrical optics rays, based on the selected wavelength and distance between the planes. The calculation can be expressed in the formula given below, where, for each directed link, i is the index of the source node; j is the index of the destination node; w is the link weight; $\Delta y$ is the vertical spacing between successive nodes along the destination plane, measured relative to the separation between the source and destination planes, which is set to 1 without loss of generality; $\lambda$ is the wavelength of the geometrical optics rays, also measured relative to the unit separation between the planes, and $k=2\pi/\lambda$:

$$\psi(y) = \sum_m e^{ikl_m}$$

$$l_m = \sqrt{1 + (i_m^2 - j_m^2)^2 (\Delta y^2)}$$

Perform an angular spectrum decomposition [Nieto-Vesperinas] of the wave field $\psi(y)$ on the destination plane, according to the formula below, in which $\alpha$ represents the angle between the wave propagation vector $\vec{k}$ and the unit vector in the horizontal direction $\hat{e}_x$:

$$A_0(\alpha) = \int_{-\infty}^{\infty} \psi(y) e^{-ik\alpha y} dy$$

Return one or more of the components of the angular spectrum decomposition $A_0(\alpha)$ as the components of the feature vector for the network graph input data set.

Figure 15:
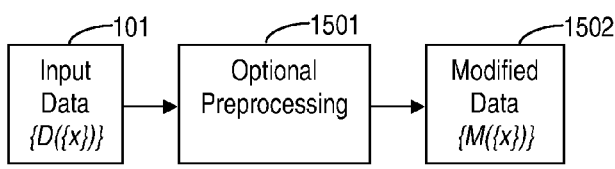
FIG. 15 is a flowchart diagram illustrating a method for performing an optional preprocessing step on the original input data set, resulting in a modified data set, in accordance with some embodiments.

FIG. 15 is a flowchart diagram illustrating a method for performing an optional preprocessing step (ex: 1501) on the original input data set {D({x})} (ex: 101), resulting in a modified data set {M({x})} (ex: 1502), in accordance with some embodiments. The modified data set {M({x})} is thereafter used in all subsequent processing steps of the invention. The use and benefits of such a general preprocessing step are well known to practitioners of numerical data analysis.

Figure 16:
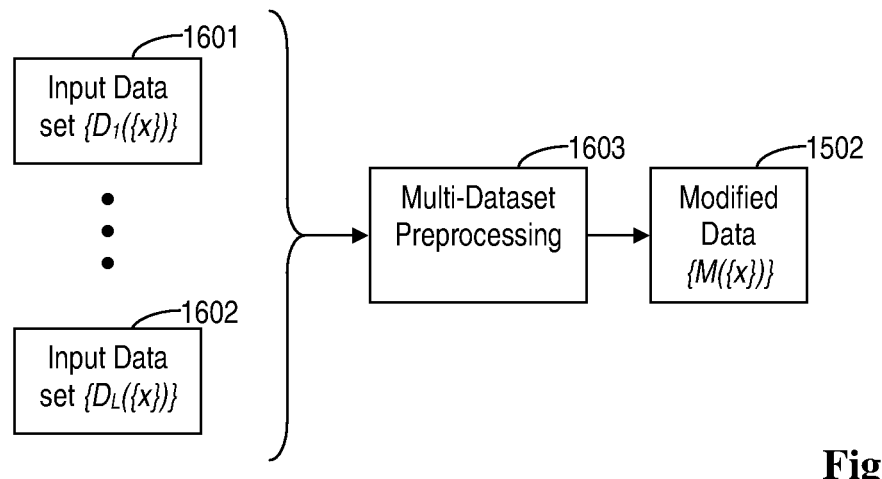
FIG. 16 is a flowchart diagram illustrating a method for performing an optional preprocessing step on multiple sets of input data, resulting in a single modified data set, in accordance with some embodiments.

FIG. 16 is a flowchart diagram illustrating a method for performing an optional multi-dataset preprocessing step (ex: 1603) on multiple sets of input data ({$D_l$({x})} (ex: 1601), through {$D_L$({X})} (ex: 1602)), resulting in a single modified data set {M({x})}, in accordance with some embodiments.

The multiple sets of input data could be of the same source and/or type or could have different sources and/or types. As one example, multiple data sets of different types might include landline telephone call records, cellular telephone call records, SMS text messages, email messages, and Internet-based instant messages.

Figure 17:
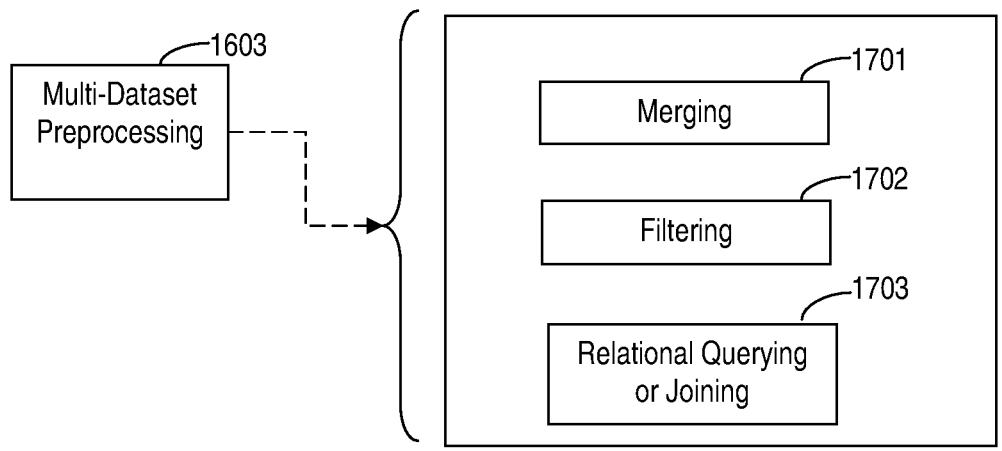
FIG. 17 is a diagram showing examples of different techniques for performing multi-set preprocessing, as described in FIG. 16, in accordance with some embodiments.
Figure 18:
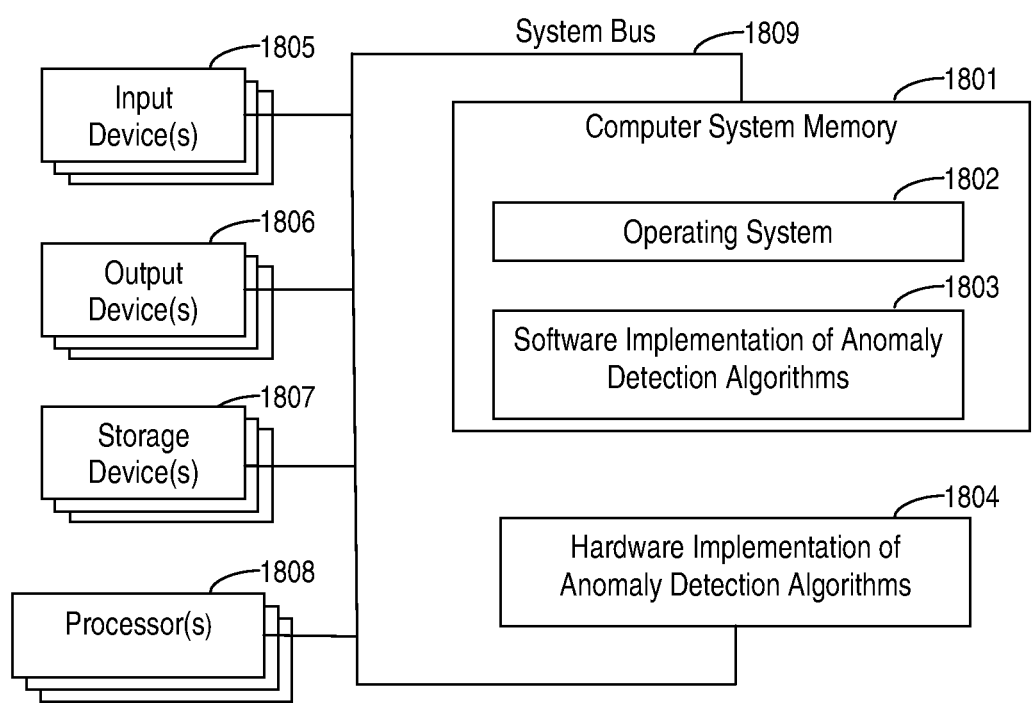
FIG. 18 is a block diagram illustrating one possible embodiment in an information handling system using either or both of a software implementation and a hardware implementation of the anomaly detection algorithms previously described.

FIG. 17 is diagram showing examples of different techniques for performing multi-set preprocessing (ex: 1603), as described in FIG. 16, in accordance with some embodiments, including:

Block 1701: If the multiple sets of input data are sufficiently similar, one possible preprocessing approach would be to simply merge them, based upon their shared attributes or fields.

Block 1702: A second possible approach would be to apply one or more filters to the multiple sets of input data. Such filters could include any of the previously preprocessing methods as well as filters that would eliminate input data elements matching one or more criteria.

Block 1703: A third possible class of methods includes those that involve performing general queries and/or joins within a relational database environment, such as multi-relational link mining techniques [Getoor].

The techniques noted above are examples for illustrative purposes only. Additional multi-dataset methods would be evident to persons of ordinary skill in the art.

FIG. 20 is a block diagram illustrating one possible embodiment of an information handling system using either or both of a software implementation and a hardware implementation of the dynamic anomaly detection method described above. The example system displayed includes a computer system memory (1801); an operating system (1802); a software implementation of the dynamic anomaly detection method (1803); a hardware implementation, such as custom silicon chips, field programmable gate arrays, etc., of the dynamic anomaly detection method (1804); one or more general input devices (1805); one or more general output devices (1806), one or more storage devices (1807); one or more processors (1808), and a system bus (1804) connecting the components.

The proposed dynamic anomaly detection system noted above is one example and for illustrative purposes only. Upon reading this disclosure, many alternative embodiments and uses of the present invention will be apparent to persons of ordinary skill in the art.

Those of skill will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Those of skill in the art may implement the described functionality in varying ways for each particular application, but such implementation decisions should not be interpreted as causing a departure from the scope of the present invention.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The benefits and advantages that may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

The invention claimed is:

1. A method for detecting anomalies, wherein the method comprises:
calculating, using at least in part one or more processors, a set of feature vectors based at least upon collected input data, wherein each of the feature vectors in the set of feature vectors comprises vector components and wherein the set of feature vectors defines a path in the vector component space;
creating, using at least in part one or more processors, a set of output values based at least upon applying one or more nonlinear sequence analysis methods to the set of feature vectors, wherein the applying the one or more nonlinear sequence analysis methods comprises applying the one or more nonlinear analysis methods along the path;
detecting anomalies in the set of output values; and
identifying corresponding anomalies in the collected input data based at least upon the detecting anomalies in the set of output values.

2. The method of claim 1, wherein the set of feature vectors and the set of output values are ordered by one or more independent variables.

3. The method of claim 1, further comprising comparing the anomalies detected to other anomalies detected in another set of output values determined from another set of feature vectors derived from another set of collected input data.

4. The method of claim 1, where the one or more nonlinear sequence analysis methods are at least one of: computing Finite-Time Lyapunov Exponents (FTLEs) for the one or more feature vectors, computing off-diagonal complexity for the one or more feature vectors, and computing temporal correlations for the one or more feature vectors.

5. The method of claim 4, where computing the FTLEs comprises estimating a Jacobian of a flow map using the one or more feature vectors.

6. The method of claim 5, where the Jacobian estimation is performed using at least one of:
finite differencing, interpolation, and tessellation.

7. The method of claim 3, further comprising clustering the input data into a plurality of clusters of input data and detecting yet other anomalies in how the set of output values varies across the clusters of input data.

8. The method of claim 1, where detecting the anomalies comprises monitoring for uncharacteristic changes in results generated using the nonlinear sequence analysis methods.

9. The method of claim 7, where detecting the anomalies comprises monitoring for uncharacteristic changes in results generated using the nonlinear sequence analysis methods across the plurality of clusters.

10. The method of claim 1, further comprising preprocessing the collected input data to calculate a modified input data set, wherein the modified input data set is used in place of the collected input data in all subsequent steps.

11. The method of claim 10, where the collected input data set comprises multiple sets of input data of the same type or of different types, which are preprocessed into a single input data set for subsequent analysis.

12. An information handling system comprising:
one or more memory units;
one or more processor units coupled to the one or more memory units; and
one or more input/output devices coupled to the one or more processor units,
wherein the one or more processor units are configured to:
calculate a set of feature vectors based at least upon collected input data, wherein each of the feature vectors in the set of feature vectors comprises vector components and wherein the set of feature vectors defines a path in the vector component space;
create a set of output values based at least upon applying one or more nonlinear sequence analysis methods to the set of feature vectors, wherein the applying the one or more nonlinear sequence analysis methods comprises applying the one or more nonlinear analysis methods along the path;
detect anomalies in the set of output values; and
identify corresponding anomalies in the collected input data based at least upon the detecting anomalies in the set of output values.

13. The system of claim 12, wherein the set of feature vectors and the set of output values are ordered by one or more independent variables.

14. The system of claim 12, the one or more processing units being further configured to compare the anomalies detected to other anomalies detected in another set of output values determined from another set of feature vectors derived from another set of collected input data.

15. The system of claim 12, where the one or more nonlinear sequence analysis methods are at least one of: computing Finite-Time Lyapunov Exponents (FTLEs) for the one or more feature vectors, computing off-diagonal complexity for the one or more feature vectors, and computing temporal correlations for the one or more feature vectors.

16. The system of claim 12, the system being further configured to cluster the input data into a plurality of clusters of input data and to detect anomalies in how the one or more output values vary across the clusters of input data.

17. A computer program product stored on a non-transitory computer operable medium, the computer program product comprising software code being effective to:
   calculate a set of feature vectors based at least upon collected input data, wherein each of the feature vectors in the set of feature vectors comprises vector components and wherein the set of feature vectors defines a path in the vector component space;
   create a set of output values based at least upon applying one or more nonlinear sequence analysis methods to the set of feature vectors, wherein the applying the one or more nonlinear sequence analysis methods comprises applying the one or more nonlinear analysis methods along the path;
   detect anomalies in the set of output values; and
   identify corresponding anomalies in the collected input data based at least upon the detecting anomalies in the set of output values.

18. The product of claim 17, wherein the set of feature vectors and the set of output values are ordered by one or more independent variables.

19. The product of claim 17, the code being further effective to compare the anomalies detected to other anomalies detected in another set of output values determined from another set of feature vectors derived from another set of collected input data.

20. The product of claim 17, where the one or more nonlinear sequence analysis methods are at least one of: computing Finite-Time Lyapunov Exponents (FTLEs) for the one or more feature vectors, computing off-diagonal complexity for the one or more feature vectors, and computing temporal correlations for the one or more feature vectors.

21. The product of claim 17, the code being further effective to cluster the input data into a plurality of clusters of input data and to detect anomalies in how the one or more output values vary across the clusters of input data.

* * * * *